(12) United States Patent
Ryser et al.

(10) Patent No.: US 11,241,114 B2
(45) Date of Patent: *Feb. 8, 2022

(54) BEVERAGE BREWING UNIT PARTICULARLY FOR MACHINES FOR PREPARING BEVERAGES FROM CAPSULES

(71) Applicant: Nestec S.A., Vevey (CH)

(72) Inventors: Antoine Ryser, Lausanne (CH); Alexandre Perentes, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 207 days.

This patent is subject to a terminal disclaimer.

(21) Appl. No.: 15/122,814

(22) PCT Filed: May 8, 2015

(86) PCT No.: PCT/EP2015/060134
§ 371 (c)(1),
(2) Date: Aug. 31, 2016

(87) PCT Pub. No.: WO2015/173123
PCT Pub. Date: Nov. 19, 2015

(65) Prior Publication Data
US 2017/0065120 A1 Mar. 9, 2017

(30) Foreign Application Priority Data
May 12, 2014 (EP) ..................... 14167833

(51) Int. Cl.
*A47J 31/36* (2006.01)
*A47J 31/22* (2006.01)

(52) U.S. Cl.
CPC ........... *A47J 31/3633* (2013.01); *A47J 31/22* (2013.01); *A47J 31/3638* (2013.01)

(58) Field of Classification Search
CPC .... A47J 31/22; A47J 31/3633; A47J 31/3638; A47J 31/407
(Continued)

(56) References Cited

U.S. PATENT DOCUMENTS

2010/0037779 A1* 2/2010 Pecci ................... A47J 31/3628
99/289 R
2010/0173053 A1* 7/2010 Ryser ................... A47J 31/3633
426/431
(Continued)

FOREIGN PATENT DOCUMENTS

EP 2077087 A1 7/2009
WO 2008096385 A1 8/2008
(Continued)

OTHER PUBLICATIONS

U.S. Appl. No. 15/302,758; Nestec S. A. filed Oct. 7, 2016; Office Action dated Dec. 8, 2017.
(Continued)

*Primary Examiner* — Tu B Hoang
*Assistant Examiner* — Alba T Rosario-Aponte
(74) *Attorney, Agent, or Firm* — K&L Gates LLP

(57) ABSTRACT

Beverage brewing units particularly for machines for preparing beverages from capsules by centrifugation are disclosed. The beverage brewing units include first and second enclosing parts moveable relative to one another that together define a centrifugal rotating chamber assembly arranged for receiving a capsule and for rotating it for the extraction of the beverage. Also disclosed are beverage production devices that include the beverage brewing units.

20 Claims, 8 Drawing Sheets

(58) Field of Classification Search
USPC .................. 99/295, 279, 300, 302 R, 302 C
See application file for complete search history.

(56) References Cited

U.S. PATENT DOCUMENTS

| | | | |
|---|---|---|---|
| 2010/0203198 A1 | 8/2010 | Yoakim et al. | |
| 2011/0000377 A1* | 1/2011 | Favre .................. | A47J 31/3628 99/289 R |
| 2011/0162530 A1* | 7/2011 | Castellani ........... | A47J 31/3633 99/279 |
| 2013/0183130 A1* | 7/2013 | Etter .................... | A47J 31/3638 414/738 |
| 2013/0206014 A1* | 8/2013 | Jarisch ................. | A47J 31/407 99/295 |
| 2013/0344206 A1* | 12/2013 | Yoakim ................. | A47J 31/52 426/232 |
| 2014/0116258 A1* | 5/2014 | Bugnano ............. | A47J 31/3633 99/293 |
| 2014/0261001 A1* | 9/2014 | Icardi .................. | A47J 31/3633 99/295 |

FOREIGN PATENT DOCUMENTS

| | | |
|---|---|---|
| WO | 2012041605 A1 | 4/2012 |
| WO | 2012085774 A1 | 6/2012 |
| WO | 2012168917 A1 | 12/2012 |
| WO | 2015173124 A1 | 11/2015 |

OTHER PUBLICATIONS

International Search Report, dated Jul. 16, 2015, in PCT/EP2015/060134, filed May 8, 2015.
Written Opinion of the International Searching Authority, dated Jul. 16, 2015, in PCT/EP2015/060134, filed May 8, 2015.
International Search Report, dated Aug. 7, 2015, in PCT/EP2015/060138, filed May 8, 2015.
Written Opinion of the International Searching Authority, dated Aug. 7, 2015, in PCT/EP2015/060138, filed May 8, 2015.

\* cited by examiner

BEVERAGE BREWING UNIT PARTICULARLY FOR MACHINES FOR PREPARING BEVERAGES FROM CAPSULES

CROSS REFERENCE TO RELATED APPLICATIONS/INCORPORATION BY REFERENCE STATEMENT

This application is a US national stage application filed under 35 USC § 371 of International Application No. PCT/EP2015/060134, filed May 8, 2015; which claims priority to Application No. EP 14167833.4, filed May 12, 2014. The entire contents of the above-referenced application are hereby expressly incorporated herein by reference.

TECHNICAL FIELD

The presently disclosed and/or claimed inventive concept(s) relates to a beverage brewing unit particularly for machines for preparing beverages from capsules containing a beverage ingredient. The presently disclosed and/or claimed inventive concept(s) further relates to a beverage preparation machine comprising such a brewing unit.

BACKGROUND

The preparation of a beverage by a capsule containing beverage ingredient is known. In general, the capsule is inserted in a beverage production device, such as a coffee machine, liquid is fed in the capsule and a beverage is extracted from the capsule under pressure or by gravity.

The preparation of a beverage by using the centrifugation is known. The principle mainly consists in providing a beverage ingredient in a receptacle of the capsule, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

The term "capsule" refers to rigid or semi-rigid container containing beverage ingredient. Other synonymous to a capsule are: "pod", "pad", "cartridge" or "sachet". The capsule can be single use. The container can also be filled with ingredient by the user to form the capsule just before use.

The term "ingredient" means any suitable beverage substance such as ground coffee, soluble coffee, leaf tea, soluble tea, herbal tea, dairy powder, culinary powder, baby food and combination thereof.

WO20080148601 relates to a system for preparing a beverage from a food substance contained in a capsule by passing water through the substance using centrifugal forces. For this, the system comprises an apparatus designed with a capsule holder for positioning and referencing the capsule in the apparatus, water feeding means for introducing water in the capsule and driving means for driving the capsule holder and so the capsule too in rotation. The capsule is usually inserted directly by the user in the capsule holder. However, the vertical arrangement of the apparatus for insertion of the capsule and ejection presents a few disadvantages. It requires the user to place the capsule in the capsule holder and remove it manually after its use. The removal operation may be risky in case of hot beverages preparation where the capsule remains hot after brewing. To solve this safety problem, the cover may remain closed until the capsule is cooled down. This quite long cooling period presents a drawback when several beverages have to be produced in a short time.

WO 2012/041605 improves the apparatus of WO2008/148601 with a hinged cover and a specifically designed capsule retrieving system using a pair of sliding clamps. The cover is moved relative to the receptacle in opening with the sliding clamps taking an inclined slope for enabling the captured capsule to be ejected in the back of the apparatus. The apparatus has a complex cinematic which must be precisely and robustly designed to ensure an alignment of the rotating parts (capsule holder and brewing interface) during closure, also associating the pivoting of the cover for enabling the removal of the capsule after each brewing cycle. This system still requires a hand-positioning of the capsule inside the capsule holder. Another disadvantage lies in that the collecting and removal of the beverage, through the collector and the beverage outlet, may require complex shaped surfaces (e.g., a ramp-shaped collector such as described in WO 2013/020940).

Therefore, there would be a need for proposing a less complex apparatus for centrifugal extraction of a beverage capsule, in particular, an apparatus which provides a more convenient and reliable manner to insert in and remove the capsule from the apparatus.

DETAILED DESCRIPTION

Figure 1:
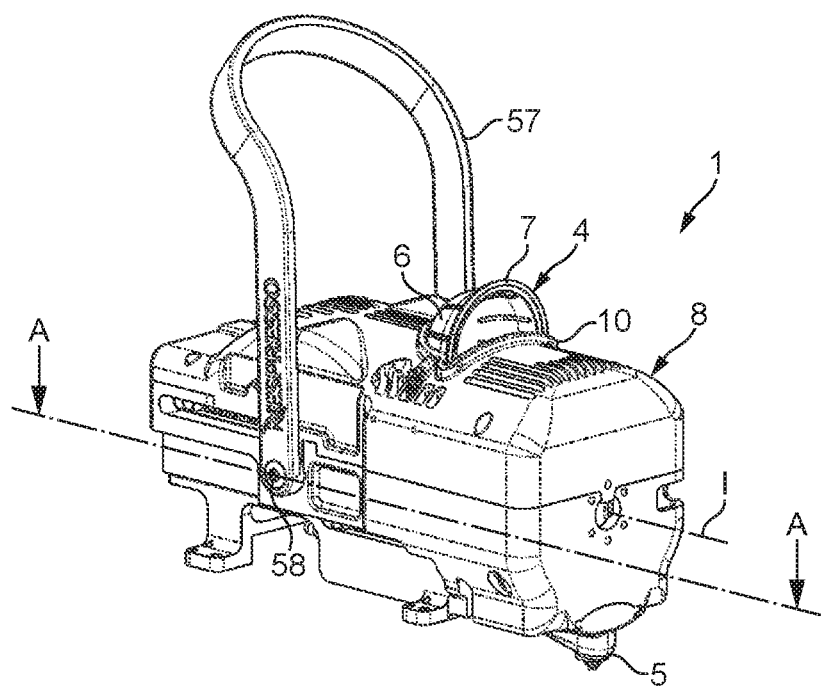
FIG. 1 shows a perspective view of the beverage brewing unit of the presently disclosed and/or claimed inventive concept(s).

According to the presently disclosed and/or claimed inventive concept(s), these objects and others are achieved with a beverage brewing unit as broadly recited in the independent claim and further expanded in the dependent claims.

In particular, the presently disclosed and/or claimed inventive concept(s) relates to a beverage brewing unit particularly for machines for preparing beverages from capsules by centrifugation.

The brewing unit comprises:
a casing,
a capsule enclosing assembly comprising a first enclosing part connected to the casing and a second enclosing part, moveable relative to the first enclosing part along a longitudinal direction, such as (but not limited to) in translatory movement, between a capsule insertion position in which the two enclosing parts are at distance from each other with a passage formed in between and a capsule enclosing position in which the capsule is enclosed between the first and second enclosing parts,
wherein the first enclosing part and the second enclosing part define together a centrifugal rotating chamber assembly arranged for receiving the capsule and for rotating it for the extraction of the beverage;
wherein the brewing unit comprises a capsule insertion assembly comprising sliding surfaces, such as (but not limited to) arranged on each lateral side of the passage, for guiding the flange of the capsule during insertion in the passage and support surfaces, such as (but not limited to) transversally oriented relative to the sliding surfaces, for holding the flange of the capsule when inserted in the passage.

In certain non-limiting embodiments, the centrifugal rotating chamber assembly comprises a capsule holder and a brewing interface member, which are arranged to be rotated together about a rotational axis substantially aligned or parallel to the said longitudinal direction of axis. Therefore, the cinematic assembly is less complex and an alignment of the rotating parts is simpler and more reliable to secure. By "substantially aligned", It is meant that the axes are not inclined relative one another of more than a few degrees, in particular, less than 5 degrees, such as (but not limited to) less than 2 degrees, or less than 1 degree.

The brewing unit further comprises a motor for driving the centrifugal rotating chamber assembly in rotation.

In certain non-limiting embodiments, a beverage collector is arranged as an annular chamber extending around the brewing interface member. As such, the beverage collector forms a chamber of simple configuration. The draining of the beverage is thereby facilitated.

In a particular, non-limiting embodiment, the brewing interface member and beverage collector are formed in the first enclosing part. In certain non-limiting embodiments, the second enclosing part comprises a cavity for receiving the body of the capsule. However, the brewing interface member and beverage collector may also be formed in the second enclosing part in mechanical inversion of the particular, non-limiting embodiment.

In an aspect, the capsule insertion assembly comprises a pair of movable jaws comprising the sliding surfaces and support surfaces. The handling by movable jaws provides a precise positioning of the capsule in the capsule insertion position in the passage. Furthermore, the load of the capsule during insertion does not exert directly on any of the rotating parts of the chamber assembly during insertion of the capsule in the device.

In certain non-limiting embodiments, the jaws are arranged for guiding the capsule towards the intermediate insertion position and holding it in said position; said jaws comprising a pair of said support surfaces for holding the capsule against gravity; wherein the jaws are moveable between a capsule holding position in which the support surfaces are close to one another a distance sufficient to hold the flange of the capsule in said position and a capsule release position in which the support surfaces of the jaws are spread apart a distance sufficient to no longer hold the flange of the capsule.

In certain non-limiting embodiments, the jaws are pivotally mounted on the casing or first enclosing part along pivot axes which are substantially parallel to the direction of longitudinal axis of relative movement of the enclosing parts. These pivot means enable the jaw to move between the capsule holding position and the capsule release position.

In a more particular aspect, the jaws are driven from the capsule release position to the capsule holding position and, from the capsule holding position to the capsule release position, by actuation means. In a particular (but non-limiting) aspect, the actuation means comprise a first and second actuation means forming parts of the second enclosing part or being, for example but not by way of limitation, shared between the second enclosing part and the capsule insertion assembly. In certain non-limiting embodiments, the first and second actuation means comprise non-telescopically projecting cam portions of the second enclosing part.

In certain non-limiting embodiments, the first actuation means is arranged to block the jaws in the capsule holding position when the first and second enclosing parts are in the capsule insertion position; the jaws thereby being prevented to spread apart by the load of the capsule when it is inserted in the passage by gravity. Therefore, it is possible to reliably handle capsules relatively heavy, of large sizes or which may contain a relatively large weight of beverage ingredient.

In one aspect, the second enclosing part comprises a pressing edge for pressing against a flange of the capsule; said edge circumventing the cavity for receiving at least a part of the body of the capsule therein. In such case, the first actuation means, in certain non-limiting embodiments, comprises a pair of first cam portions extending longitudinally beyond the pressing edge in direction of the first enclosing part. The first actuation means may further comprise a pair of complementary cam portions for engagement with the pair of first cam portions and provided on the jaws or on (upper) extension parts of the jaws.

In certain non-limiting embodiments, the second actuation means also comprises a pair of second cam portions extending rearwardly offset relative to the pressing edge, such as (but not limited to) along the sides of the second enclosing part and protruding outwardly. The second actuation means may further comprise a pair of complementary cam portions provided on the capsule insertion assembly, such as on a surface of the jaws or of (lower) extension portions of the jaws.

In particular, the first and second actuation means are arranged at relative spacial distance respectively above and below the pivot axles of jaws on the casing or first enclosing part.

In certain non-limiting embodiments, the jaws are held in each position by force retaining means so as to be able to take two stable positions i.e., capsule holding and release positions.

In particular, the force retaining means comprise, for each jaw, a resilient biasing member (e.g., springs) connected respectively to the jaw and to the casing or first enclosing part, on each side of the pivot axle of the jaw, to force the jaw in one of the two positions, thereby forming stable positions, depending on the offset position of the pivot axle relative to the line connecting the connection points of the resilient biasing member.

In certain non-limiting embodiments, the force retaining means comprises, for each jaw, a magnetic arrangement providing a magnetic attraction force between the jaw and a portion of the casing or first enclosing part when the jaw is positioned in any one of the two positions.

In certain non-limiting embodiments, the first enclosing part also comprises a brewing interface member with elastic pushing means, such as (but not limited to) at least one spring-blade, which act on the capsule, such as (but not limited to) its lid, to unstick it from the said member.

In certain non-limiting embodiments, the second enclosing part also comprises capsule ejecting means which engage the capsule, such as (but not limited to) its body, to facilitate its removal from the cavity.

The presently disclosed and/or claimed inventive concept(s) also relates to a beverage production device comprising a brewing unit as aforementioned, wherein the brewing unit is arranged so that the capsule enclosing assembly comprising the first enclosing part and second enclosing part is moveable relative to a substantially longitudinal direction of horizontal axis. Indeed, the brewing unit provides the advantage to allow a vertical insertion of the capsule in the passage and vertical (downward) ejection of the capsule out of the passage by effect of gravity. Therefore, the intervention of the user during these two phases is minimized.

By "horizontal", it is meant an axis which is purely horizontal or an axis which does not differ more than: 15 degrees, such as (but not limited to) 10 degrees, or 5 degrees, from horizontal.

The present detailed description is given as a non-limiting (preferable) mode in which many variations and combinations are still possible. In particular, the use of terms such as "preferably", "optionally", "in general", "may", "for example", "non-limiting" (etc.) provide a suitable vocabulary intended to relate to the broadest possible embodiments of the presently disclosed and/or claimed inventive concept(s) as well as to allow the general inventive concept(s) to take the form of many possible options. In particular, essential or non-essential technical characteristics described in this section can be individually combined with more general characteristics present the claims, unless the combinations appear technically infeasible to the skilled artisan.

By reference to FIGS. 1 to 4, the presently disclosed and/or claimed inventive concept(s) relates to a beverage brewing unit 1, such as a brewing unit of a coffee machine. The unit of the presently disclosed and/or claimed inventive concept(s) first comprises a capsule enclosing assembly comprising a first enclosing part 2 and a second enclosing part 3.

The brewing unit is generally conceived to receive and enclose a capsule 4 for the preparation of a beverage by feeding water in the capsule, extracting the beverage out of the capsule and dispensing it through a beverage outlet 5 generally located in front of the unit. The unit is further conceived to eject the capsule using gravity; the capsule generally falling through the passage and into a capsule collecting bin (not illustrated).

The capsule 4 has generally a cup-shaped body 6 with a rim or flange 7 extending outwardly and a lid such as a sealing membrane and/or filter wall. The capsule generally contains a dose of beverage ingredient such as roast and ground coffee for preparing a coffee extract, soluble coffee, leaf or soluble tea for preparing a tea extract and the like.

In the illustrated example, the first enclosing part 2 is static relative to an outer casing 8 of the brewing unit. The outer casing can be formed in two or more parts. The second enclosing part 3 is mobile relative to the first enclosing part and outer casing 8, from an open position in which a passage 9 is formed between the two enclosing parts and a closed position in which the passage 9 is eliminated and the capsule is enclosed and in engagement between the two enclosing parts for enabling the preparation of the beverage.

The passage 9 forms a through-opening, such as (but not limited to) vertically oriented, positioned between the two enclosing parts 2, 3 when the two parts are spaced apart in the fully open or capsule insertion position of the brewing unit. Above the passage, is provided (in certain non-limiting embodiments) an insertion hole 10 of a sufficient size for insertion of the capsule 4 by gravity. The insertion hole may be given a shape complementary to the shape of the capsule and/or guiding sliders for facilitating the introduction and guidance of the capsule during insertion through the casing. Below the passage is also provided (in certain non-limiting embodiments) an ejection opening of a sufficient size for ejection of the capsule from the passage 9.

The second enclosing part 3 is actually mobile or moveable, from the open position to the closed position and reciprocally, along a main longitudinal direction of open/closure movement, defined along axis I, relative to the first enclosing part 2. For this, the second enclosing part 3 is guided in its opening/closing movement in or along the casing 9. The casing may extend forwardly by the beverage outlet 5. However, this is not mandatory and the beverage outlet can also be associated directly to the first enclosing part 2 and be mobile with it.

In the illustrated example, the second enclosing part 3 is guided via a pair (such as (but not limited to) two pairs) of guiding pins or rods 11, 12 (FIG. 3) along a pair (such as (but not limited to) two pairs) of opposite guiding rails 13, 14 provided on the inner side walls of the casing 8 and extending longitudinally along or parallel to the axis I.

It should be noted that the longitudinal direction of movement of axis I is, in certain non-limiting embodiments, horizontal or slightly horizontal and the passage 9 extends, in certain non-limiting embodiments, vertically or slightly vertically. "Slightly" refers here to a variation relative to the strictly, respectively, horizontal or vertical directions of not more than about 15-20°.

The second enclosing part 3 comprises a cavity 15 dimensioned for receiving the body or, at least part of the body, of the capsule 4. The second enclosing part 3 further comprises a pressing edge 16 which generally applies closure forces on the flange 7 of the capsule in the closed position; such flange being squeezed between the pressing edge 16 and a complementary pressing portion or edge 17 of the first enclosing part 2 in the closed position of the unit (see FIG. 16).

The brewing unit is centrifugal brewing unit for preparing the beverage by application of centrifugal forces to the liquid fed in the capsule. For this the first and second enclosing parts define together a centrifugal rotating chamber assembly arranged for receiving the capsule and for rotating it for the extraction of the beverage.

In certain non-limiting embodiments, the first enclosing part 2 comprises a brewing interface member 19, for engaging the capsule, in particular its lid and/or flange, which is rotationally mounted, such as via (ball) bearing(s) 20, relative to a base member 21 of the first enclosing part. In certain non-limiting embodiments, a collector 18 is formed in the first enclosing part 2 to collect beverage leaving the capsule by effect of centrifugation from the brewing interface member 19. In particular, the collector 18 is provided as an annular chamber extending extending around the brewing interface member.

In certain non-limiting embodiments, the second enclosing part 3 also comprises a capsule holder 22, which is rotationally mounted, such as via (ball) bearing(s) 23, on a base member 24 of the second enclosing part. The capsule holder 22 is further linked to a rotary motor 25 via a rotational axle 26.

Figure 16:
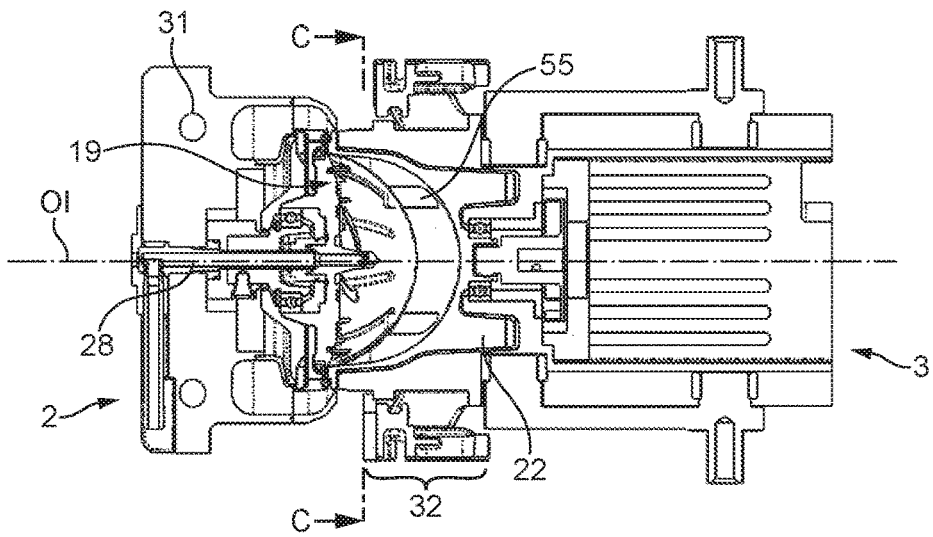
FIG. 16 is a cross sectional view of the beverage brewing unit of FIG. 1 along the cut plane of direction A-A in closure of the brewing unit in which the capsule is enclosed by the first and second enclosing parts.
Figure 17:
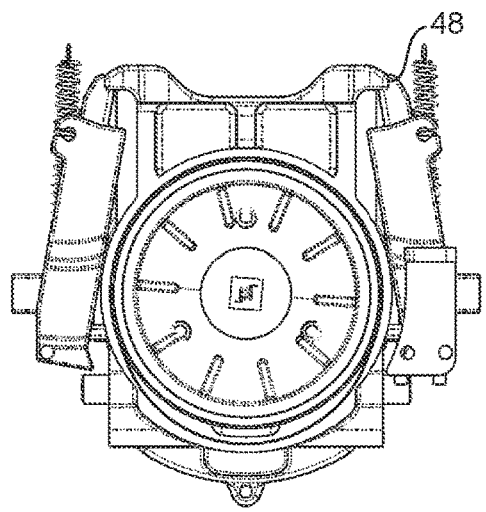
FIG. 17 is a view in plane direction C-C of the beverage brewing unit of FIG. 16.

In the closed position of the brewing unit illustrated in FIG. 16, the capsule holder 22 of the second enclosing part and the capsule inserted in the cavity are driven in rotation (centrifugation) about a median longitudinal axis O1. The brewing interface 19 is thus also driven in rotation about the same axis O1.

Figure 2:
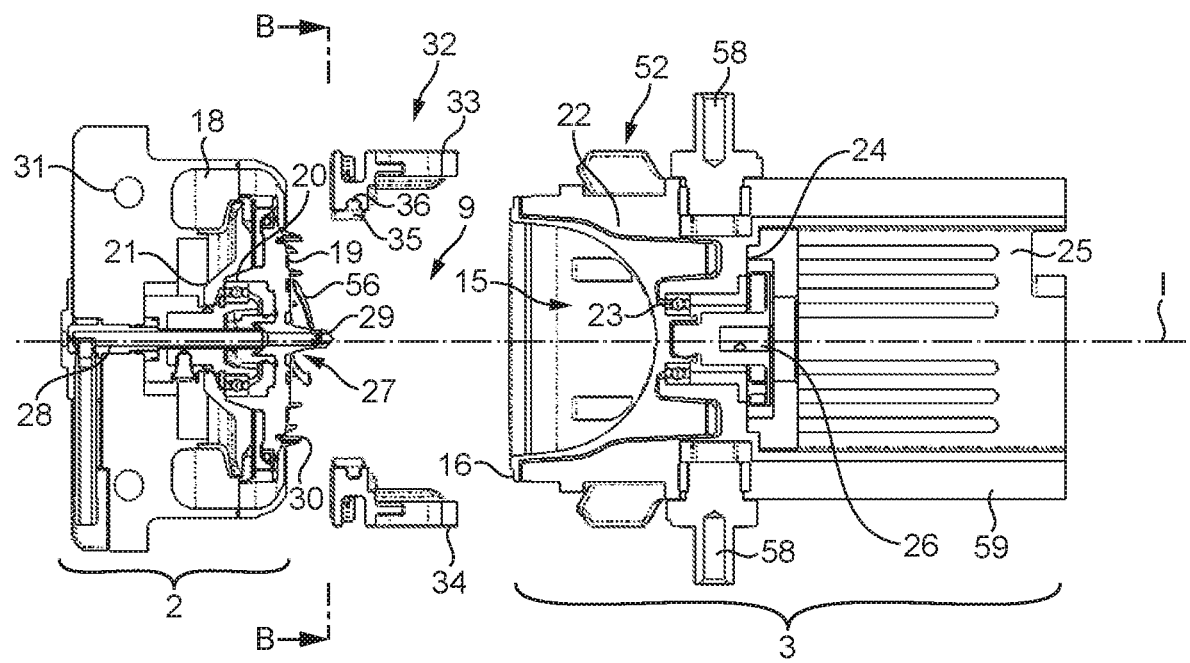
FIG. 2 shows a cross sectional view of the beverage brewing unit of FIG. 1 along the cut plane of plane direction A-A when the unit is open.
Figure 3:
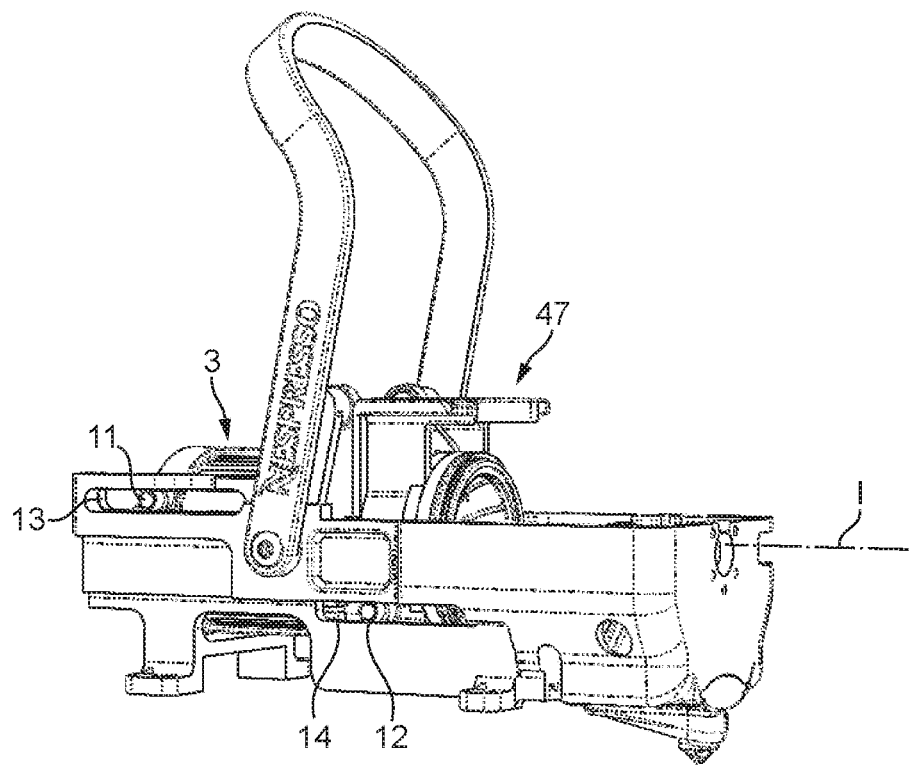
FIG. 3 shows a perspective view of the beverage brewing unit of FIG. 1 with the upper part of the casing and the first enclosing part being removed.
Figure 4:
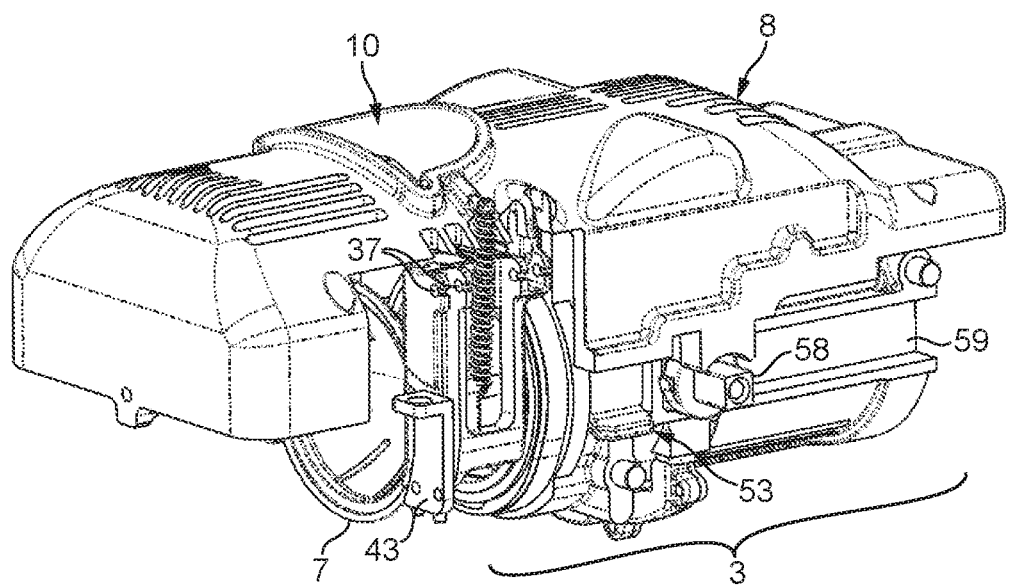
FIG. 4 shows a perspective view of the beverage brewing unit of FIG. 1 or 2 with the lower part of the casing and the first enclosing part being removed.
Figure 12:
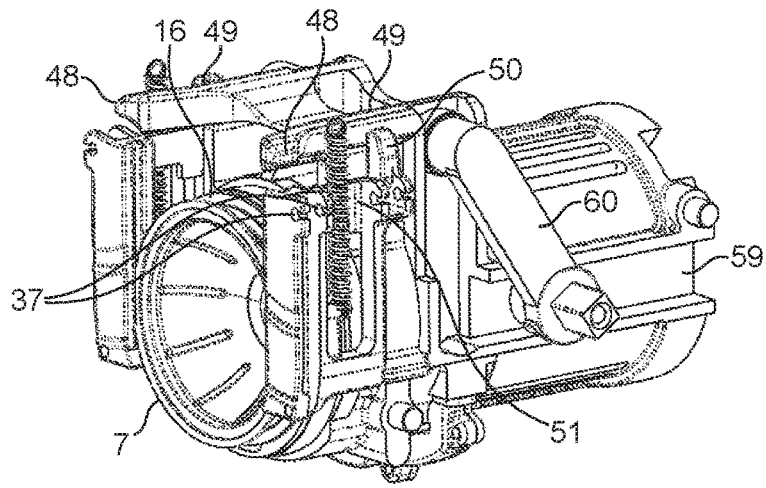
FIG. 12 is a partial perspective view of the beverage brewing unit of FIG. 10.

In the present case, as shown in FIG. 2, the first enclosing part 1 comprises liquid injection means 27 to supply liquid, generally hot water, within the capsule, during extraction in the closed position of the enclosing parts (FIG. 12). However, in possible variations, the liquid injection means could as well be positioned at the second enclosing part 3 such as directly behind the cavity. The liquid injection means 27 comprises a conduit of liquid 28, such as (but not limited to) aligned with the longitudinal rotation axis O1, and an injection lance or needle 29. The lance or needle protrudes from the engaging surface of the brewing interface member 19 to enable to perforate or enter in the capsule. In certain non-limiting embodiments, the lance or needle 29 further comprises liquid inlet(s) for distributing liquid inside the capsule in one or more privileged directions.

The brewing interface member 19 may optionally also comprise a beverage heating means 31 to maintain the beverage (e.g., centrifuged liquid coffee extract) at a suitable serving temperature in the collector before draining through the outlet. The beverage heating means can be formed integrally with the collector 18 or be a separate element connected to it.

It should be noted that, in general, the brewing unit is, in certain non-limiting embodiments, intended to be arranged with a substantially horizontal or slightly inclined longitudinal direction of movement I. Also, the longitudinal rotation axis O1 is generally substantially aligned with the longitudinal direction of movement I. However, it is possible that compensation means of play are necessary to compensate for a possible misalignment of the enclosing parts.

The brewing interface member 19 may optionally also comprise beverage extraction means for assisting the beverage in draining from the capsule. For example, the beverage extraction means comprises a series of perforation members 30 for creating openings through the lid of the capsule. The perforation members can be small spikes, blades, needles and the like. It should be noted that, in possible reverse or simply different configurations, these extraction means can be positioned inside the cavity 15 or be distributed respectively on surfaces of the first and second enclosing members.

It should be noted that a configuration of the first enclosing part being mobile along the longitudinal direction of open/closure movement of the brewing unit (axis I) and the second enclosing part 3 being static relative to the casing 8 is also possible. It is also possible to have both first and second enclosing parts 2, 3 mobile relative to the casing 8 in the longitudinal direction I from the open position to the closed position and reciprocally.

It should be noted that in possible variants, the first and/or second enclosing part(s) 2, 3 can be movable along the longitudinal direction of axis I, for only a final or small portion of the closing path of the brewing unit. Therefore, the movement of first and/or second enclosing part(s) can encompass movements having directions which are curved, inclined and/or parallel to axis A during the closure of the brewing unit before the final portion of the closing path, such as in the initial portion of the closing path.

According to a central aspect of the presently disclosed and/or claimed inventive concept(s), the brewing unit comprises a capsule insertion assembly 32 comprising a pair of symmetrically arranged jaws 33, 34 arranged for guiding the capsule when inserted in the passage through the insertion hole 10 and for holding it in place. The jaws are generally positioned on each side of the passage. They are movable between a capsule holding position and a capsule release position. Each jaw generally comprises a support surface 35 for holding the flange 7 of the capsule and preventing it from falling by gravity. The surfaces 35 generally extend transversally relative to the direction of insertion of the capsule or direction of extension of the passage (or relative to the guiding surfaces of the jaws) in order to stop the flange of the capsule. The jaws are pivotally associated to a static part of the unit, such as (but not limited to) to the casing. In particular, the jaws may be connected to a U-shaped portion 63 of the casing. It should be noted that the jaws could also be connected, in an equivalent manner, to the first enclosing part 2.

Figure 5:
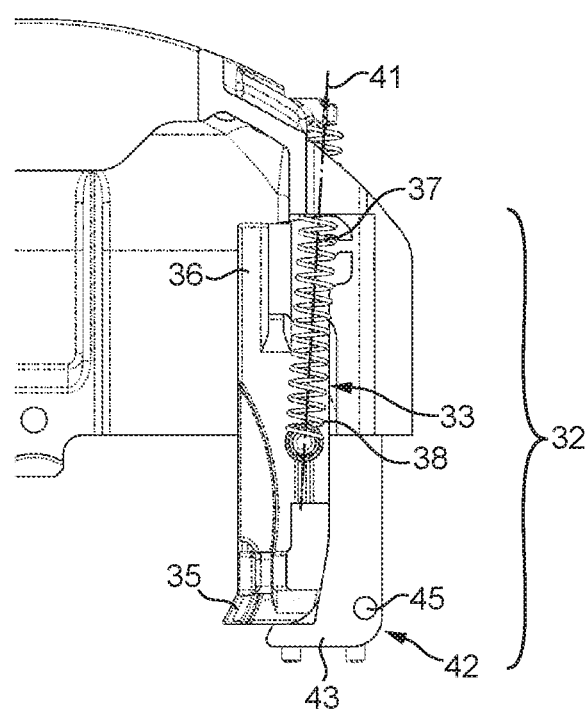
FIG. 5 is a partial view along plane direction B-B of the capsule insertion assembly (one jaw only) in the capsule holding position (without capsule being inserted in the passage).
Figure 6:
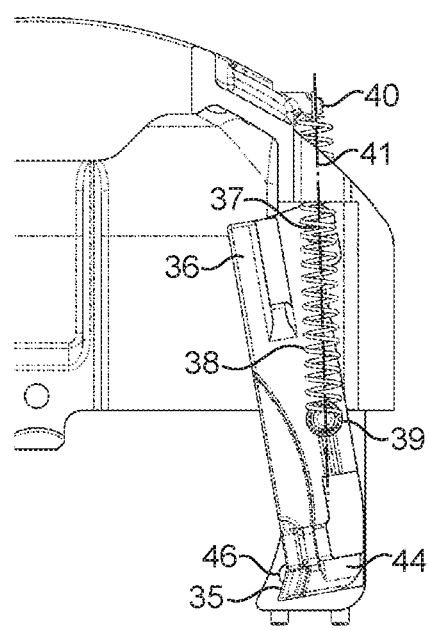
FIG. 6 is a partial view along plane direction B-B of the capsule insertion assembly (one jaw only) in the capsule release position (without capsule being inserted in the passage).

FIGS. 5 and 6 illustrate a particular (but non-limiting) example of the capsule insertion assembly 32. The capsule insertion assembly formed by the pair of jaws is generally symmetrical with respect to the vertical longitudinal plane passing through axis I (so is also, in certain non-limiting embodiments, the brewing unit in general). In certain non-limiting embodiments, each jaw 33 comprises, above the support surface 35, a guiding sliding surface 36, which may be shaped as an inwardly oriented U, for receiving the flange 7 of the capsule. Therefore, when the capsule is inserted in the unit, the flange of the capsule is properly guided along this surface and is finally stopped by the support surface 35 which extends substantially transversally relative to the sliding surface 36 in the position of FIG. 5 representing the capsule holding position. For this, the diameter of the flange 7 of the capsule is typically greater than the transversal distance between the support surfaces 35 when the jaws are in the capsule holding position. Each jaw is pivotally mounted on the casing along a pivot axle 37. In certain non-limiting embodiments, the pivot axles are parallel to the direction of relative movement of axis I of the enclosing parts. Therefore, the jaws are able to take two positions, a capsule holding position (FIG. 5) and a capsule release position (FIG. 6) by rotating along the pivot axle 37.

In certain non-limiting embodiments, the jaws 33, 34 are maintained in each position by force retaining means. In the particular (but non-limiting) example, the force retaining means comprise, for each jaw, a resilient member 38, such as a traction helical spring (or equivalent means), connected respectively at a first end or connection point 39 respectively to a lower portion of the jaw positioned below the pivot axle 37 and at a second end or connection point 40 to the casing positioned above the pivot axle 37. The force retaining means are thereby arranged such that the jaws can take only two stable positions depending on the offset position of the pivot axle 37 relative to the extension line 41 connecting the connection points 39, 40 of the resilient member. In particular, FIG. 5 illustrates the jaw in the capsule holding position in which the pivot axle 37 is outwardly offset relative to the extension line 41 of the resilient member. The resilient member (traction spring) exerts thereby a traction force sufficient to keep the jaw in such position. In FIG. 6, the jaw moved to its capsule release position in which the support surfaces 35 of the two jaws are spread apart (i.e., a distance greater than the diameter of the flange of the capsule). In this position, the pivot axle 37 is positioned inwardly offset relative to the connection points 39, 40. Again, the resilient member 38 exerts a traction force sufficient to keep the jaw in such position.

In certain non-limiting embodiments, the force retaining means further (or alternatively) comprise a magnetic arrangement 42 providing a magnetic attraction force between each jaw and a portion 43 of the casing (or it may alternatively be a portion of the first enclosing part) when the jaw is positioned in the two stable positions. In particular, the lower portion of the jaw comprises a ferro-magnetic element or magnet 44 and the portion 43 of the casing comprises two separate ferro-magnetic elements or magnets 45, 46; each one being positioned at a short distance to secure the jaw in the two stable positions. In particular, the two ferro-magnetic or magnets 45, 46 are arranged at a short transversal distance from each other. Therefore, in the capsule holding position of FIG. 5, the jaw is secured firmly in position by the attraction created between the element 44 of the jaw and the element 46 of the casing. Whereas in the capsule release position of FIG. 6, the jaw is secured firmly in position by the attraction created between the element 44 of the jaw and the element 45 of the casing. It should be noted that the terms "ferro-magnetic elements" or "magnets" are used here to refer to elements showing a magnetic attraction to each other when submitted to a magnetic field or creating a magnetic field.

It should be noted that the force retaining means could be simply limited to the magnetic arrangement (with no resilient member).

According to an aspect of the presently disclosed and/or claimed inventive concept(s), the jaws are driven from the capsule release position (FIG. 6) to the capsule holding position (FIG. 5) by first actuation means and, from the capsule holding position to the capsule release position by second actuation means. This will now be explained in greater detail.

Figure 7:
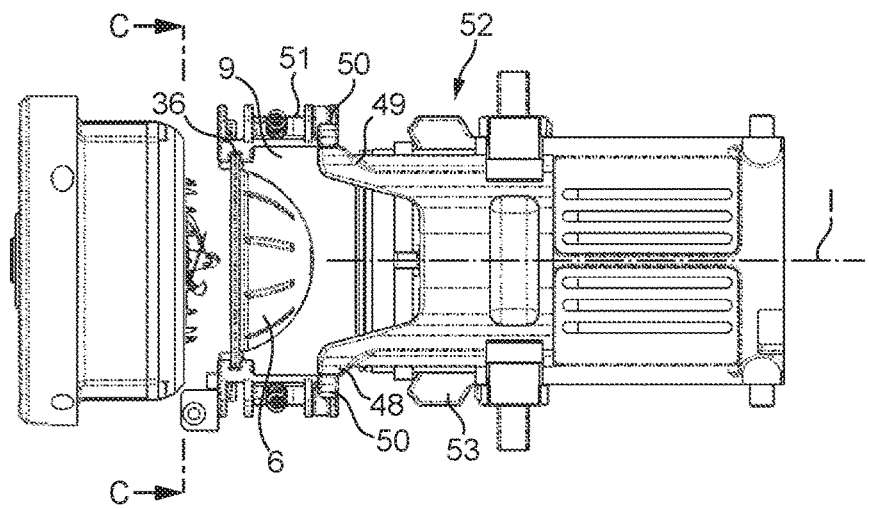
FIG. 7 is a cross sectional view of the beverage brewing unit of FIG. 1 along the cut plane of direction A-A in capsule insertion position with a capsule being inserted in and held in intermediate insertion position by the capsule insertion assembly.
Figure 8:
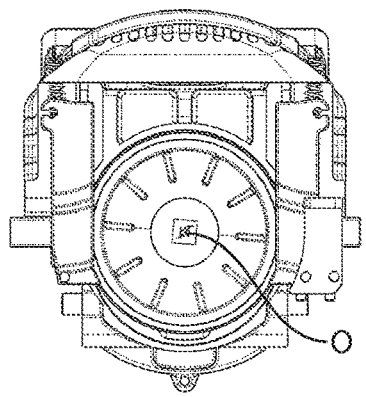
FIG. 8 is a view in plane direction C-C of the beverage brewing unit of FIG. 7.
Figure 9:
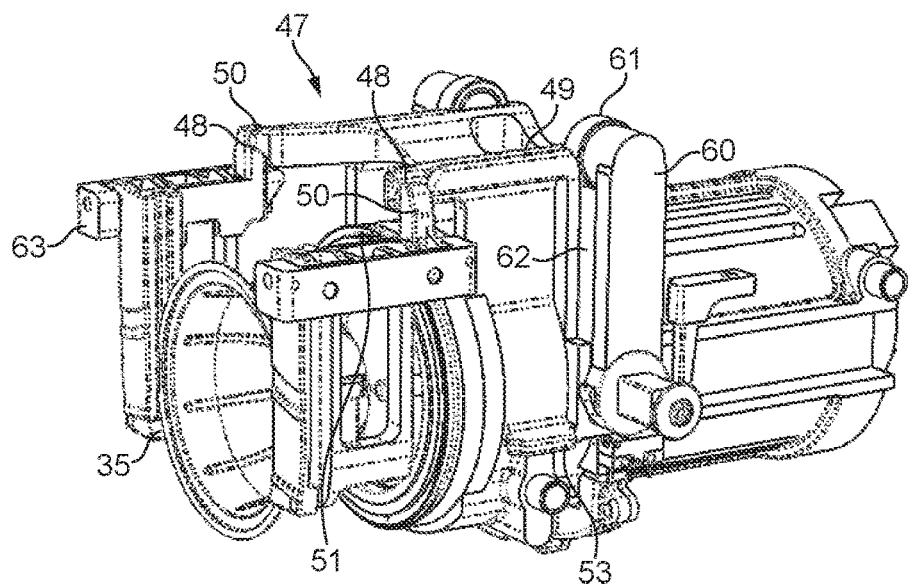
FIG. 9 is a partial perspective view of the beverage brewing unit of FIG. 7.

In particular, first actuation means 47 are non-telescopic and provided, at least partially, on top of the second enclosing part 3. The actuation means 47 extend also symmetrically on each side of the passage 9 above the jaws. The first actuation means 47 comprise a pair of first cam portions 48 extending longitudinally beyond the pressing edge 16 of the second enclosing part in direction of the first enclosing part. Each cam portion 48 is provided on a rigid elongated extension member 49 which is fixedly connected to the outer surface of the enclosing part 3 and which extends forwardly in direction of the first enclosing part 2. The elongated member terminates at its free end by the cam portion 48 oriented outwardly. The cam portion is arranged to engage a complementary cam portion 50, provided on the jaw. i.e., forming the complementary part of the first actuation means 47. More particularly, the jaw comprises an extension member 51 which extends rearwardly in direction of the second enclosing member 3 and which comprise the complementary inwardly projecting cam portion 50. It should be noted that the elongated extension member 49 and the extension member 51 provide a certain distance between the jaws and the pressing edge 16 of the second enclosing part 3. This distance enables to insert in the passage, capsules with relatively deep bodies (FIGS. 7 to 9). The length of the members 49, 51 can be adjusted by design depending on the depth of the capsules to be received in the brewing unit.

By the relatively rigid engagement of the cam portions 48, 50 together, as also determined by the rigidity of the extension members 49, 51, the jaws become blocked in the capsule holding position and are prevented from spreading apart when the capsule is received on the support surface. The rigidity is sufficient to maintain the jaw blocked under the force exerted by the load of the capsule during the fall of the capsule in insertion and after its guiding along the sliding surfaces.

The capsule insertion assembly further comprises second actuation means 52 for moving the jaw from the capsule holding position (FIG. 5) to the capsule release position (FIG. 6). The second actuation means 52 are part of the second enclosing member 3. They are arranged at a certain distance from the first actuation means 47 so that they act on the jaws when the second enclosing part becomes sufficiently close to the first enclosing part.

Figure 10:
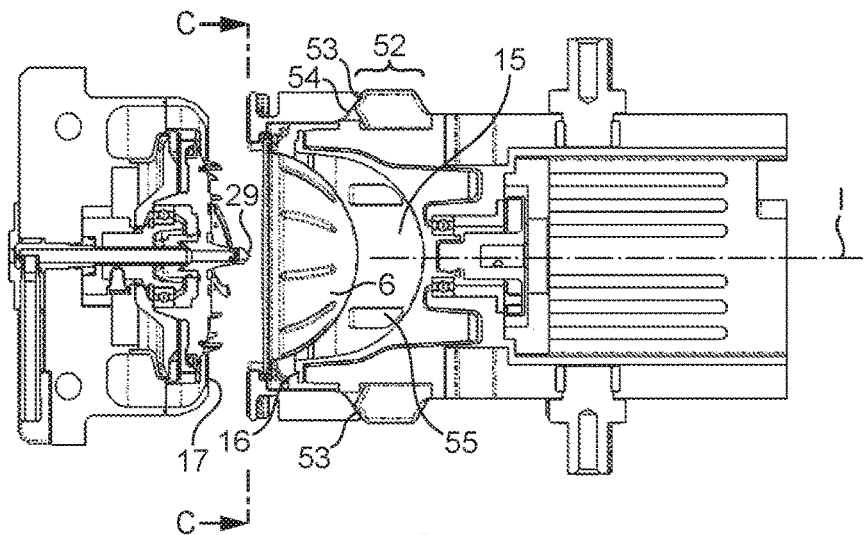
FIG. 10 is a cross sectional view of the beverage brewing unit of FIG. 1 along the cut plane of direction A-A during the closure of the brewing unit with a capsule being held in the capsule insertion assembly still in capsule holding position.

In particular, the second actuation means 52 comprise non-telescopic outwardly projecting cam portions 53 provided on each side of the enclosing part. Each projecting cam portion 53 is, in certain non-limiting embodiments, arranged rearwardly offset relative to the pressing edge 16. The projecting cam portion 53 is arranged for engaging a complementary cam portion 54 of the jaw, i.e., forming the complementary part of the second actuation means 52, when the second engaging portion moves relatively to the first engaging portion in the approaching phase of the closure of the unit (FIG. 10). The actuation means 52 are positioned below the axial line of the pivot axle 37 of the jaws such that the jaws are forced to pivot from the holding position of FIG. 5 to the release position of FIG. 6. By such engagement of the two cam portions 53, 54, the jaws are forced to spread apart thereby releasing the flange of the capsule. The arrangement of the cam portions is such that such release occurs when the flange 7 of the capsule is sufficiently close to the pressing edge 16 of the second enclosing part, thereby ensuring a precise positioning, respectively, centering of the capsule in the cavity (FIGS. 10 and 12).

Figure 19:
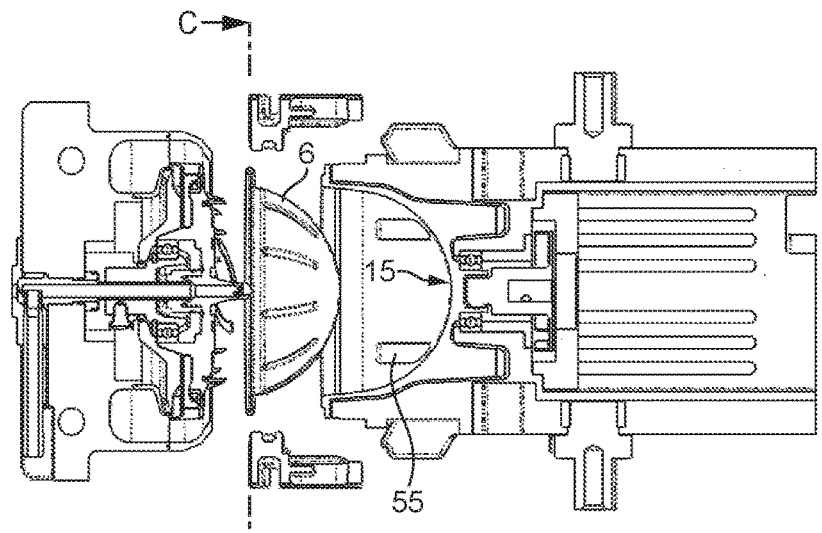
FIG. 19 is a cross sectional view of the beverage brewing unit of FIG. 1 along the cut plane of direction A-A during the re-opening of the beverage brewing unit for ejection of the capsule from the cavity of the second enclosing part.

As illustrated in FIG. 19, in order to facilitate the removal of the capsule from the cavity 15 of the second enclosing part 3, the second enclosing part may comprise capsule ejecting means 55. In certain non-limiting embodiments, the ejecting means are configured to engage with the body 6 of the capsule. It should be noted that the ejecting means could also be configured to engage the flange 7 of the capsule such as by having a spring-biased pressing edge. In the illustrated mode, the ejecting means comprises at least one pusher slidably mounted in a housing of the capsule holder 22, against an elastic biasing means such as a coil spring (not represented). Of course, many equivalent variations to the present form of the ejecting means can be envisaged.

Figure 13:
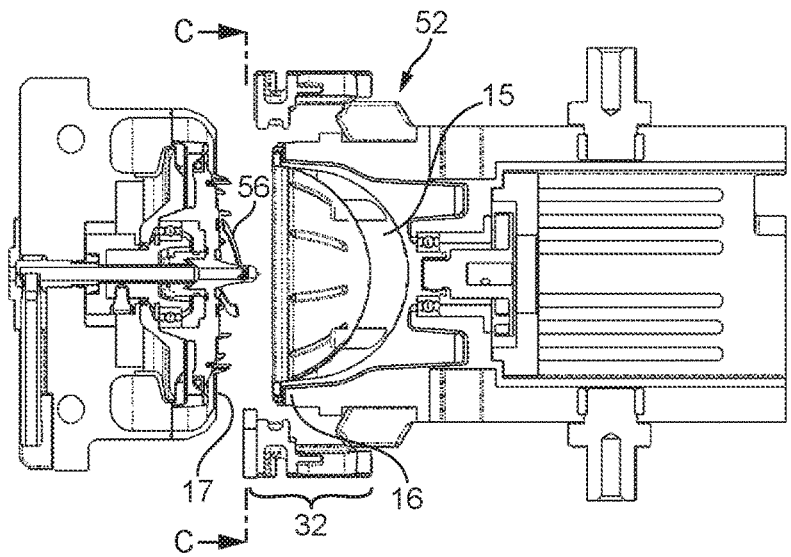
FIG. 13 is a cross sectional view of the beverage brewing unit of FIG. 1 along the cut plane of direction A-A during the closure of the brewing unit with a capsule being released by the capsule insertion assembly.
Figure 14:
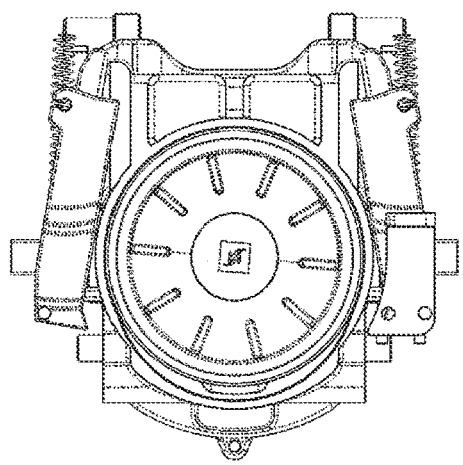
FIG. 14 is a view in plane direction C-C of the beverage brewing unit of FIG. 13.
Figure 15:
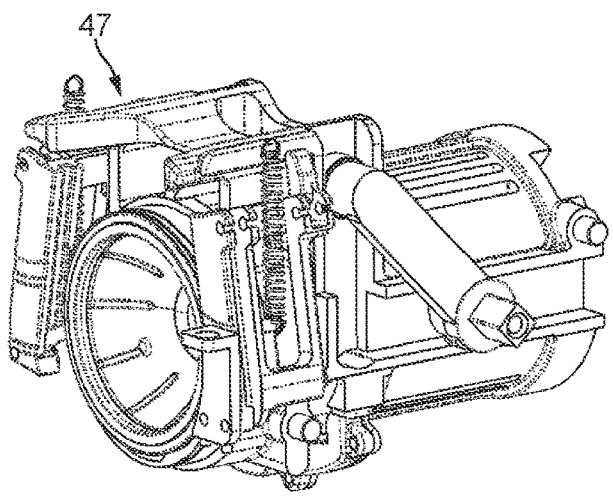
FIG. 15 is a partial perspective view of the beverage brewing unit of FIG. 13.

As also illustrated in FIG. 13, for instance, when the brewing unit is re-opened, it may be necessary to unstick the capsule from the engaging surface of the first enclosing part 2, in particular, from its piercing means or needle. For that elastic pushing means, in certain non-limiting embodiments, one or more spring-blades 56, can be provided, such as on the surface of the brewing interface member, which act against the capsule to exert axial forces in the direction of the first enclosing part.

The movement of the second enclosing part 3 relative to the first enclosing part 2 can be driven mechanically or by way of a motorized assembly such as described in WO 2012/025258.

Figure 18:
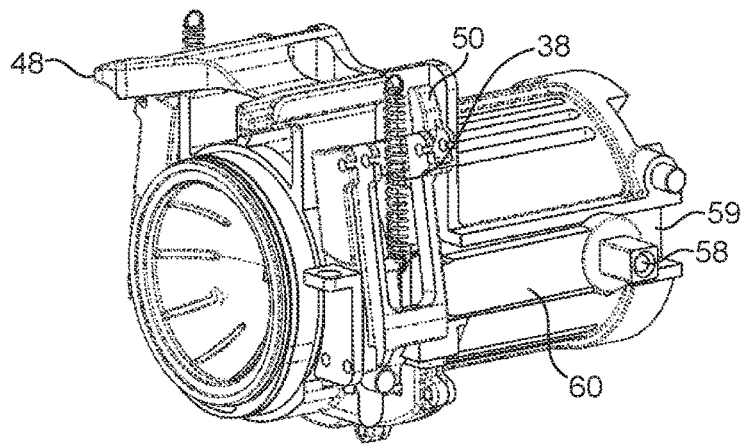
FIG. 18 is partial perspective view of the beverage brewing unit of FIG. 16.

In the present example, the second enclosing part 3 comprises a lever-type actuating assembly enabling to move the second enclosing part 3 along the longitudinal direction of axis I in guidance with the guiding rails or slots 13, 14 of the casing. In particular, as shown in FIG. 1, a lever-type actuating assembly comprises a cam means for transforming the rotating movement of a manual handle 57 in a translational movement of the enclosing part along the casing. In particular, the handle is pivotally mounted on the casing via transversal axles 58. On each side of the enclosing part 3, the axle 58 is capable of longitudinally sliding along a longitudinal grooved path 59 during the movement of the enclosing part. Such axle 58 is also connected to a lever 60 comprising, at its free end, a cam disc 61 which engages in an upwardly oriented grooved path 62. Therefore, when the handle is manipulated from a vertical arrangement (FIG. 1) to a substantially horizontal arrangement (FIG. 18), the cam disc 61 which is rigidly connected to the handle via the lever 60 travels down in guidance in the transversal grooved path 59 to force the second enclosing part to move forward in direction of the first enclosing part. The full movement of the enclosing part from the open to the closed position and vice versa can be obtained easily by a 90-degree rotational movement of the handle. The system is thus relatively simple and reliable.

The presently disclosed and/or claimed inventive concept(s) further relates to a beverage production device comprising the brewing unit of the presently disclosed and/or claimed inventive concept(s). In certain non-limiting embodiments, the brewing unit is positioned in the device horizontally so as to enable a capsule to be inserted by gravity in the insertion hole 10 and be taken in charge by the jaws. More particularly, the capsule enclosing assembly comprising the first enclosing part 2 and second enclosing part 3 is moveable relative to a substantially longitudinal direction of horizontal axis I. The beverage production device (not represented) may comprise, as known per se, a water reservoir, a water pump, a water heater for supplying hot water to the liquid conduit 28 and a control unit for controlling the preparation of the beverage, in particular, the flow rate of the water pump and the rotation of the motor driving the rotation of the centrifugal chamber assembly.

The functioning of the brewing unit of the presently disclosed and/or claimed inventive concept(s), in particular, concerning the insertion, enclosing and ejection of the capsule, will now be described in relation to FIGS. 7 to 21.

In the capsule insertion position of FIGS. 7-9, the enclosing parts are spread apart from each other to leave a passage 9 sufficiently longitudinally long to enable a capsule, after insertion in the insertion hole 10 of the casing, to be guided along the sliding surface 36 of the jaws and be retained on the support surfaces 35 of the same jaws. In this position, the jaws are in the capsule holding position and the first actuation means 47 are engaged thereby blocking the jaws in the holding position. In particular, the cam portion 48 of the actuation means 47 is engaged with the complementary cam portion 50 of the jaws. The capsule is therefore sitting in an insertion intermediate position in which the center line O of the capsule is substantially aligned (or slightly inclined due to the play between the flange of the capsule and the sliding surfaces of the jaws) with the central axis I. In the present context, the capsule is designed as a rotationally symmetrical element which is intended to be rotated at elevated velocity along its central axis in a centrifugal/rotational brewing unit in which it is important to maintain a precise positioning of the capsule inside the cavity to avoid damaging the capsule and/or generating vibrations. However, the presently disclosed and/or claimed inventive concept(s) may apply with a non-symmetrical capsule and/or a system in which the brewing unit is a not centrifugal/rotational. However, a correct alignment of the capsule with the enclosing parts, e.g., the cavity, is still important to maintain for a proper enclosing and/or tightness of the capsule relative to the enclosing parts.

Figure 11:
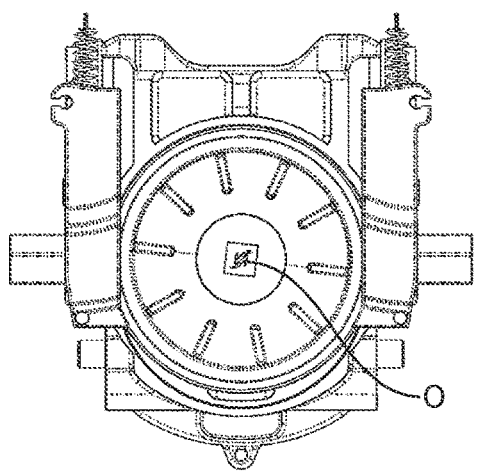
FIG. 11 is a view in plane direction C-C of the beverage brewing unit of FIG. 10.

When the handle 57 is moved down, the second enclosing part 3 is forced to move closer to the first enclosing part 2 as illustrated in FIGS. 10-12. The capsule insertion assembly remains in the capsule holding position in this intermediate closing phase, due to the stability of the jaws in capsule holding position, so that the capsule can be maintained in its intermediate position of reference in engagement between the jaws.

As the second enclosing part 3 becomes close enough to the first enclosing part 2 (FIGS. 13-15), the jaws are forced to spread apart in the capsule release position by the second actuation means 52 becoming engaged. The capsule is no longer maintained by the jaws but is sufficiently close to the edge of the cavity 15 to be held by the cavity of the second enclosing part. As the enclosing part continues to move relatively to the first enclosing part, the capsule fits in the cavity. It is also possible to have the first enclosing part be sufficiently close to the capsule to center it well and hold it by the piercing means or needle 29 as the enclosing parts are closing about the capsule.

As the second enclosing part 3 is further moved towards the first enclosing part 2, the flange of the capsule becomes pressed by the pressing edge 16 of the second enclosing part and then by the one 17 of the first enclosing part. In the closed position of the brewing unit, the body of the capsule is housed in the cavity 15; its flange being squeezed between the two pressing edges. The capsule insertion assembly 32 is sufficiently retracted away from the second enclosing part. This position corresponds to the beverage brewing position. Generally, the extraction centrifugation can be run by feeding water in the capsule via the liquid injection means 27, the capsule can be rotated by driving the capsule holder 22 in rotation via the rotary motor. The centrifuged beverage can be collected in the collector 18 and be drained through the beverage outlet 5.

Figure 20:
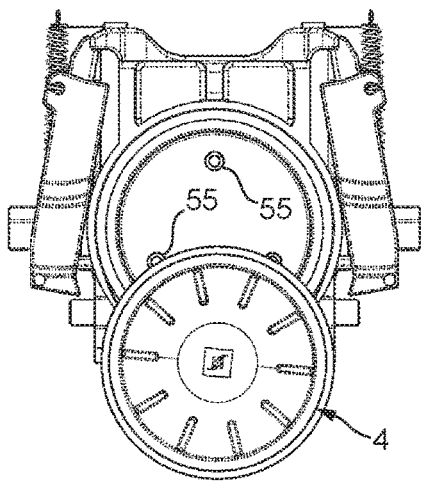
FIG. 20 is view in plane direction C-C of the beverage brewing unit of FIG. 19.
Figure 21:
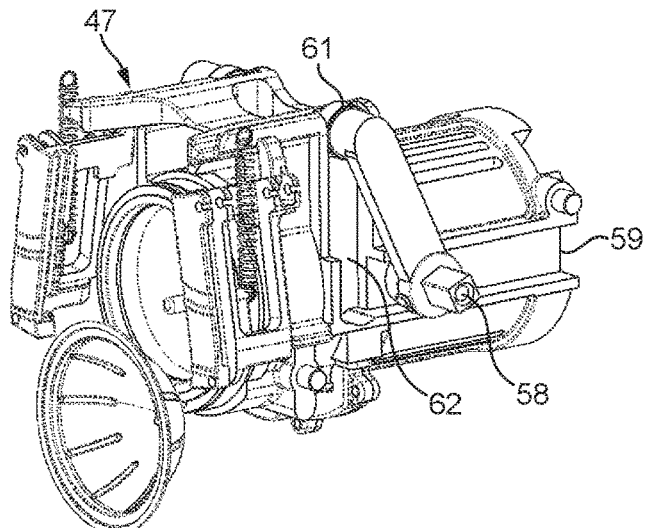
FIG. 21 partial perspective view of the beverage brewing unit of FIG. 19.

After the beverage preparation, the unit is re-opened as illustrated in FIGS. 19-21 by driving the second enclosing part 3 via the handle and moving it away from the first enclosing part along the longitudinal direction I. Since the capsule insertion assembly is given a stable position (capsule release position), the jaws remains open thereby allowing the capsule to be ejected from the cavity by the capsule ejecting means 55 and then falling through the passage wide open.

In the next phase, as the second enclosing part is still moved away, the capsule insertion assembly becomes engaged by the first actuation means and blocked for insertion of a new capsule in the passage (back to the situation of FIGS. 7-9).

The invention claimed is:

1. A beverage brewing unit for a device for preparing a beverage from a capsule by centrifugation, the beverage brewing unit comprising:
    a casing;
    a capsule enclosing assembly comprising a first enclosing part connected to the casing and a second enclosing part moveable relative to the first enclosing part along a longitudinal direction of a horizontal axis, between a capsule insertion position in which the first and second enclosing parts are at distance from each other with a passage formed in between and a capsule enclosing position in which the capsule is enclosed between the first and second enclosing parts, wherein the first and second enclosing parts together define a centrifugal rotating chamber assembly arranged for receiving the capsule and for rotating the capsule about a longitudinal rotation axis for extraction of the beverage;
    a capsule insertion assembly comprising a pair of jaws, each of the jaws is pivotally mounted on the casing along a corresponding pivot axle that is parallel to the longitudinal direction of the horizontal axis, the jaws rotatable in a plane perpendicular to the longitudinal direction of the horizontal axis and comprising sliding surfaces and support surfaces, the sliding surfaces arranged on each lateral side of the passage and close to one another at a distance sufficient to hold and guide a flange of the capsule along the sliding surfaces during insertion in the passage until the flange of the capsule is finally retained by the support surfaces, and the support surfaces are transversally oriented relative to the sliding surfaces for holding the flange of the capsule when inserted in the passage and for preventing fall of the capsule by gravity;
    a first actuation arrangement and a second actuation arrangement positioned at a longitudinal distance from each other along the longitudinal direction of the longitudinal axis,
    wherein the first actuation arrangement is configured to engage a first complementary member on the jaws to block the jaws and prevent the jaws from spreading apart when the capsule is received on the support surface; and
    the second actuation arrangement is configured to engage a second complementary member on the jaws to force the jaws to spread apart to release the capsule from the capsule enclosing assembly through the passage when the second enclosing part moves relatively towards the first enclosing part and the first and second enclosing parts are close to each other.

2. The beverage brewing unit according to claim 1, wherein the centrifugal rotating chamber assembly comprises a capsule holder and a brewing interface member, which are arranged to be rotated together about a rotational axis aligned or parallel to the longitudinal direction of horizontal axis.

3. The beverage brewing unit according to claim 2, further comprising a beverage collector arranged as an annular chamber extending around the brewing interface member.

4. The beverage brewing unit according to claim 1, wherein the jaws of the capsule insertion assembly are arranged for guiding the capsule towards an intermediate insertion position and holding the capsule in the intermediate insertion position, wherein the jaws are moveable between a capsule holding position in which the support surfaces are close to one another a distance sufficient to hold the flange of the capsule in the capsule holding position and a capsule release position in which the support surfaces of the jaws are spread apart a distance sufficient to no longer hold the flange of the capsule.

5. The beverage brewing unit according to claim 4, wherein the jaws are driven from the capsule release position to the capsule holding position and from the capsule holding position to the capsule release position by a plurality of cam portions engaging with cam portions on the first actuation arrangement and cam portions on the second actuation arrangement, respectively.

6. The beverage brewing unit according to claim 4, wherein the jaws are held in each position by force retaining means, wherein the force retaining means comprise, for each jaw:
    a resilient biasing member connected respectively to the jaw and to the casing or the first enclosing part, on each side of the pivot axle of the jaw, to force the jaw in one of the capsule insertion position and the capsule enclosing position, thereby forming stable positions, depending on an offset position of the pivot axle relative to a line connecting connection points of the resilient biasing member;
    or
    a magnetic arrangement providing a magnetic attraction force between the jaw and a portion of the casing or the first enclosing part when the jaw is positioned in the capsule insertion position or the capsule enclosing position.

7. The beverage brewing unit according to claim 1, wherein the second enclosing part is configured for translatory movement relative to the first enclosing part along the longitudinal direction of the horizontal axis.

8. The beverage brewing unit according to claim 1, wherein the first enclosing part comprises a brewing interface member with at least one spring-blade which acts on the capsule to unstick the capsule from the beverage interface member.

9. The beverage brewing unit according to claim 1, wherein the second enclosing part comprises a portion which engages the capsule to facilitate removal of the capsule from a cavity of the second enclosing part.

10. A beverage production device for preparing a beverage from a capsule by centrifugation, the beverage production device comprising:
    a beverage brewing unit comprising:
        a casing;
        a capsule enclosing assembly comprising a first enclosing part connected to the casing and a second enclosing part moveable relative to the first enclosing part along a longitudinal direction of a horizontal axis, between a capsule insertion position in which the first and second enclosing parts are at distance from each other with a passage formed in between and a capsule enclosing position in which the capsule is enclosed between the first and second enclosing parts, wherein the first and second enclosing parts together define a centrifugal rotating chamber assembly arranged for receiving the capsule and for rotating the capsule about a longitudinal rotation axis for extraction of the beverage;

a capsule insertion assembly comprising a pair of jaws, each of the jaws is pivotally mounted on the casing along a corresponding pivot axle that is parallel to the longitudinal direction of the horizontal axis, the jaws rotatable in a plane perpendicular to the longitudinal direction of horizontal axis and comprising sliding surfaces and support surfaces, the sliding surfaces arranged on each lateral side of the passage and close to one another at a distance sufficient to hold and guide a flange of the capsule along the sliding surfaces during insertion in the passage until the flange of the capsule is finally retained by the support surfaces, and the support surfaces transversally oriented relative to the sliding surfaces for holding the flange of the capsule when inserted in the passage and for preventing fall of the capsule by gravity;

a first actuation arrangement and a second actuation arrangement positioned at a longitudinal distance from each other along the longitudinal direction of the longitudinal axis, wherein the first actuation arrangement is configured to engage a first complementary member on the jaws to block the jaws and prevent the jaws from spreading apart when the capsule is received on the support surface; and the second actuation arrangement is configured to engage a second complementary member on the jaws to force the jaws to spread apart to release the capsule from the capsule enclosing assembly through the passage when the second enclosing part moves relatively towards the first enclosing part and the first and second enclosing parts are close to each other; and wherein the brewing unit is arranged so that the capsule enclosing assembly comprising the first enclosing part and the second enclosing part is moveable relative to the longitudinal direction of the horizontal axis.

11. The beverage production device according to claim 10, wherein the second enclosing part is configured for translatory movement relative to the first enclosing part along the longitudinal direction of the horizontal axis.

12. The beverage production device according to claim 10, wherein the centrifugal rotating chamber assembly comprises a capsule holder and a brewing interface member, which are arranged to be rotated together about a rotational axis aligned or parallel to the longitudinal direction of the horizontal axis.

13. The beverage production device according to claim 12, further comprising a beverage collector arranged as an annular chamber extending around the brewing interface member.

14. The beverage production device according to claim 10, wherein the jaws of the capsule insertion assembly are arranged for guiding the capsule towards an intermediate insertion position and holding the capsule in the intermediate insertion position, wherein the jaws are moveable between a capsule holding position in which the support surfaces are close to one another a distance sufficient to hold the flange of the capsule in the capsule holding position and a capsule release position in which the support surfaces of the jaws are spread apart a distance sufficient to no longer hold the flange of the capsule.

15. The beverage production device according to claim 14, wherein the jaws are driven from the capsule release position to the capsule holding position and from the capsule holding position to the capsule release position by a plurality of cam portions engaging with cam portions on the first actuation arrangement and cam portions on the second actuation arrangement, respectively.

16. The beverage production device according to claim 14, wherein the jaws are held in each position by force retaining means, wherein the force retaining means comprise, for each jaw:

a resilient biasing member connected respectively to the jaw and to the casing or the first enclosing part, on each side of the pivot axle of the jaw, to force the jaw in one of the capsule insertion position or the capsule enclosing position, thereby forming stable positions, depending on an offset position of the pivot axle relative to a line connecting connection points of the resilient biasing member;

or a magnetic arrangement providing a magnetic attraction force between the jaw and a portion of the casing or the first enclosing part when the jaw is positioned in the capsule insertion position or the capsule enclosing position.

17. The beverage production device according to claim 10, wherein the first enclosing part comprises a brewing interface member with at least one spring-blade which acts on the capsule to unstick the capsule from the beverage interface member.

18. The beverage production device according to claim 10, wherein the second enclosing part comprises a portion which engages the capsule to facilitate removal of the capsule from a cavity of the second enclosing part.

19. The beverage brewing unit according to claim 1, wherein the first actuation arrangement is positioned on the second enclosing part and comprises a pair of cam portions that extend longitudinally beyond the second enclosing part in a direction toward the first enclosing part, each cam portion fixedly connected to an outer surface of the second enclosing part, and wherein the pair of cam portions each engage a complementary cam portion on the pair of jaws.

20. The beverage brewing unit according to claim 1, wherein the second actuation arrangement is positioned on the second enclosing part and comprises a pair of cam portions that are positioned rearwardly relative to the first actuation arrangement, wherein the pair of cam portions each engage a complementary cam portion on the pair of jaws.

* * * * *